United States Patent
Nicolas

(10) Patent No.: US 10,531,128 B2
(45) Date of Patent: Jan. 7, 2020

(54) COMPRESSION AND DECOMPRESSION OF VIDEO DATA

(71) Applicant: STMICROELECTRONICS (GRENOBLE 2) SAS, Grenoble (FR)

(72) Inventor: Marina Nicolas, Voreppe (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 201 days.

(21) Appl. No.: 15/223,221

(22) Filed: Jul. 29, 2016

(65) Prior Publication Data

US 2017/0201771 A1 Jul. 13, 2017

(30) Foreign Application Priority Data

Jan. 8, 2016 (FR) ...................................... 16 50160

(51) Int. Cl.
*H04N 19/895* (2014.01)
*H04N 19/48* (2014.01)

(52) U.S. Cl.
CPC ........... *H04N 19/895* (2014.11); *H04N 19/48* (2014.11)

(58) Field of Classification Search
CPC ...... G06T 9/00; H04N 19/154; H04N 19/186; H04N 19/426; H04N 19/48; H04N 19/895
See application file for complete search history.

(56) References Cited

U.S. PATENT DOCUMENTS

| | | | | |
|---|---|---|---|---|
| 5,142,362 A | * | 8/1992 | Masera | H04N 21/236 348/700 |
| 5,357,352 A | * | 10/1994 | Eschbach | H04N 1/608 348/E9.042 |
| 8,472,517 B2 | * | 6/2013 | Caster | H04N 19/117 348/453 |
| 9,386,190 B2 | * | 7/2016 | Lebowsky | H04N 19/46 |
| 2002/0021754 A1 | * | 2/2002 | Pian | H04N 19/176 375/240.02 |
| 2007/0070468 A1 | * | 3/2007 | Ogawa | H04N 1/6075 358/518 |
| 2007/0177033 A1 | | 8/2007 | Bennett et al. | |
| 2008/0198925 A1 | * | 8/2008 | Sayre | H04N 7/17318 375/240.01 |
| 2011/0064131 A1 | * | 3/2011 | Park | H04N 19/176 375/240.2 |
| 2014/0219558 A1 | * | 8/2014 | Teng | G06T 9/00 382/166 |
| 2015/0042659 A1 | * | 2/2015 | Holland | G06T 3/4092 345/428 |
| 2015/0093023 A1 | * | 4/2015 | Greenebaum | G06T 9/00 382/166 |

FOREIGN PATENT DOCUMENTS

| | | |
|---|---|---|
| WO | 2014121219 | 8/2014 |
| WO | 2015020773 | 2/2015 |

* cited by examiner

*Primary Examiner* — Md N Haque
(74) *Attorney, Agent, or Firm* — Slater Matsil, LLP

(57) ABSTRACT

A method for compressing a data block including sets of homologous components may include selecting a designated component from the data block, and compressing non-designated components with a measurable loss less than or equal to a threshold. The method may further include compressing the designated component based upon at least a selection of values from among the values of the homologous designated components associated with the data of the block.

22 Claims, 3 Drawing Sheets

COMPRESSION AND DECOMPRESSION OF VIDEO DATA

RELATED APPLICATIONS

This application is a translation of and claims the priority benefit of French patent application number 1650160 filed on Jan. 8, 2016, entitled "Compression And Decompression of Video Data" which is hereby incorporated by reference to the maximum extent allowable by law.

TECHNICAL FIELD

This disclosure relates to the compression and decompression of data, particularly in the context of storage of video image data.

BACKGROUND

Generally, in the image processing context, an image frame to be displayed on a screen (e.g., the screen of a television set) is represented by a matrix structure of digital information representing a grid of data or pixels. Each pixel is assigned several color components, each having a level or amplitude for the pixel in question. For example, these may be red R, green G and blue B components in the RGB calorimetric system, or luminosity Y and chrominance Cr and Cb in the YCbCr calorimetric system. Such a structure of pixels, or "bitmap", therefore corresponds pixel by pixel to the image, with each pixel being referenced in the plane of the image by its address.

In the YCbCr colorimetric system, a sub-sampling of the chrominance components is generally performed and is usually expressed by the notation YCbCr-J:a:b (e.g., YCbCr-4:2:0). The J:a:b notation denotes the number of chrominance components in a conceptual region of J columns and two rows of pixels, where "a" is the number of samples of the chrominance components in the first row of J pixels, and "b" is the number of samples of the chrominance components in the second row of J pixels.

A color is defined by a sample of the chrominance components. Examples of YCbCr sampling are shown in FIG. 1, in which the pixels are represented by squares and a color, which can be common to several pixels in the case of a sub-sampling, is represented by a circle or an ellipse.

In transcoding systems, a video signal is received in an encoded format, for example according to the H264 or HEVC standards, and is then decoded into an RGB or YCbCr format, which is more voluminous in terms of memory space.

Various processing operations are usually applied to the decoded images before being transmitted to a display system. Between each processing, the images are stored (e.g., in buffer memories) in the decoded format.

To be able to transcode high resolution video signals, the memories of the systems need to have a large capacity. This has disadvantages, for example, with regard to energy consumption and the space occupied in an electronic circuit.

It can therefore be advantageous to perform a compression of the decoded images before storage, and then a decompression when reading from the memory before processing. Such use of compression and decompression should not introduce degradation of the images, and also should not be very complex to allow these operations to be carried out in real time.

To limit the degradation, the compression factor should not be too high, ranging up to 5, for example. Moreover, the limitation on the complexity may prohibit the use of methods of compensation of movement and of information from adjacent images or regions of the image distant from the data block being processed.

In typical compression and decompression operations carried out independently on the three components of an item of data, it is possible for erroneous pixels to occasionally appear because of inconsistencies in the quantifications of the different components of a same pixel. The potential correlations between components are not taken into account, and it turns out that the overall compression may be more efficient by taking account of the potential correlations.

It is possible to apply a second compression processing to eliminate the redundancies between two components, but this would be at the cost of calculating an independent first compression over each component. It is also possible to add a pre-processing of the data to move into a more advantageous colorimetric domain, offering a homogeneous distribution of the notable differences over the three components, for example. However, this type of pre-processing generally requires complex nonlinear transformations.

Moreover, there are so-called asymmetric methods in which a greater compression is carried out on a component considered to be less important than the others. Yet, this type of compression produces very bad performance in cases where the sacrificed component is locally pertinent.

Typical compression/decompression methods have either low compression factors, data degradation, or very high complexities. Furthermore, they may be difficult to apply at the input/output of the memories of transcoding systems.

SUMMARY

According to one embodiment, a method of compression and decompression of a data block is provided, which increases the average compression factor of an item of data and retains desired image quality while being of relatively low complexity.

The compression and the decompression of a component, called the designated component, may be performed using only certain values of this component while taking into account the values of the other components of the data in the block. A reconstruction calculation for the designated component is performed from the values of the other components, which is less complex than the calculations implemented by the usual predictions used for the other components.

It is therefore possible to significantly increase the average compression factor of the components, while generating desired results in terms of structural similarity (SSIM). The term SSIM denotes a measure of the visual quality of a compressed image, in comparison with the original image, structurally and not pixel to pixel.

Thus, according to one aspect, a method of compressing a data block is provided, where the data is respectively allocated with sets of homologous components. The method may include selecting a component called the designated component, compressing the non-designated components with measurable loss less than or equal to a threshold, and compressing the designated component by selecting at least one value from among the values of the homologous designated components associated with the data of the block.

Two homologous components associated with two items of data are the components relative to a same physical magnitude, but able to have different values for the two items of data. Thus, by way of example, if the data are pixels, the R components associated with these two pixels are homologous components.

The compression method may be adapted for the compression of a digital image signal, in which each item of data is a pixel of an image, and each component set associated with a pixel includes three components representative of the colorimetric space of the pixel.

Those skilled in the art are capable of measuring the loss undergone during a compression. For example, this may be done by reconstructing the values of the components by decompression, and by comparing the original values of the components with the reconstructed values while applying a signal-to-noise ratio criterion. In order to measure the loss undergone it is also possible to apply a measurement of the SSIM type. Those skilled in the art will appreciate how to adapt the threshold value as a function of the present application and of the desired quality. Thus, the lower the threshold is (or even zero), the higher the quality of the compression, or even without loss (in a conservative context) if the threshold is zero.

The method according to this aspect implements a compression (preferably of high quality) over the non-designated components, and a compression of very low complexity over a designated component of an item of data. The selection of the designated component is locally adapted to a data block.

The compression method according to this aspect may be applied in a conservative context. In a conservative context, that is to say without loss of information in the reconstructed image after a compression/decompression, the compressions are generally of sufficiently high quality for the residual error over the components to be quantified by a technique depending on a statistical distribution of the error.

The compression method according to this aspect may also be applied in a non-conservative context. That is, it may be applied with losses of information in comparison with the original, but with a similar reconstructed image. In fact, the compression according to this aspect may introduce only imperceptible losses, or losses that are not very annoying from a visual point of view, as a function of the chosen threshold.

The method proposed according to this aspect may be directly applicable in the usual calorimetric systems of the RGB and YCbCr type. This may avoid superfluous conversions into another calorimetric system.

For example, two of the three components (RGB or YCbCr) follow a usual predictive compression. For example, this may be JPEG or PFG, as described in the patent application FR 3,001,600(A1). In the RGB system, the third component, i.e., the designated component, is compressed by considering that its variations are proportional to the variations of the other two components. In the YCbCr system, the designated component is a Cb or Cr chrominance component, and the compression is carried out by considering that the variations of the designated component are proportional to the variations of the other chrominance component. The compression can also be carried out by considering that the variations of the designated component are proportional to the variations of the two components, as in the RGB system, but by considering the luminance component Y only when a chrominance is present (in the case of a possible sub-sampling, such as, for example, in the YCbCr-4:2:0 mode).

Using the hypothesis that the gradient of the values of the designated component is proportional to the gradient of the values of one or more non-designated components, and knowing the values of the non-designated components over the data block, it suffices to know the maximum and minimum of the designated component to be able to carry out a reliable reconstruction of the designated component, for example. This hypothesis is generally verified in the case of a block of sufficiently small size of a natural image.

For example, in a 4K image (i.e., having a definition of 4,096×2,160 pixels) the pixels of a block of 4*4 pixels typically have similar colors. Thus, according to one implementation, the particular values are the extrema of the values of the designated homologous components associated with the data of the block.

Only two values are therefore transmitted in order to reconstruct all of the designated components of the data block. These values are able to be slightly quantified to provide a compression factor in accordance with the architectural constraints. The compression of the designated component may comprise an identification of the addresses of the data of the block including extrema of values.

The identification of the addresses allows a higher performance, at the cost of a greater occupation of the memory by the compressed designated component. The compression of the designated component may comprise generating a dependence indication representative of a correlation between the designated component and at least one non-designated component.

The selection of the designated component may be based on an estimation of the minimum risk of generating an error over that component during the compression/decompression. Thus, according to one implementation, the designated component is the component whose values over all of the data of the block exhibit the smallest range of variation. In fact, the component having the weakest entropy, i.e., the component whose range of variation is the smallest, generally exhibits the least risk of generating errors in the color of the pixels of the block.

Generally there are no more than two significantly different colors in such a block, and only in the case where the block comprises the contour of an object. Moreover, in a large majority of cases where two colors are present, it happens that one of the components varies little in any event.

Moreover, in the RGB system, it is generally known that it is the G component which carries the most information on the luminance of the pixel, and consequently the designated component is selected from among the R or B components. Similarly, in the YCbCr system, the designated component is selected from among the Cb or Cr chrominance components.

Moreover, it is common that typical compression methods implement a selection based on parameters which may be the entropy level. Thus, the selection of the designated component does not introduce additional processing compared with the compression used over the non-designated components.

According to one implementation, the method may include quantifying the residual error of the compression of the designated component. A quantification of the residual error may be performed by typical techniques based on a statistical distribution of the error, such as an exponential-Golomb code. This makes it possible to use the method in a conservative context.

According to another aspect, there is proposed a method of decompression of a data block compressed according to the compression method such as defined above, the decompression method comprising, for each item of data in the block, a decompression of the non-designated components, a reconstruction of the value of the designated component taking account of the particular values and of the values of the decompressed non-designated components.

This method may be adapted to the decompression of a digital image signal in which each item of data is a pixel of an image, and each set of components associated with a pixel includes three components representative of the colorimetric space of the pixel. According to one implementation, the reconstruction of the value of the designated component includes a limitation by the particular values. This mechanism makes it possible to have continuity of color at the borders of two adjacent blocks when more than one color is present over a block.

The decompression of the designated component advantageously takes into consideration a possible correlation between the designated component and at least one non-designated component. More particularly, the decompression is based on the hypothesis that the designated component follows the look of one or more non-designated components, with the idea that the color is substantially constant over the block. This hypothesis is generally verified in the case of a block of sufficiently small size of a natural image.

Thus, according to one implementation, for each item of data of the block, the reconstruction of the value of the designated component may include a linear combination between the values of the decompressed non-designated components of the item of data, the particular values of the designated component of the data of the block, and the values of the decompressed non-designated components of chosen data.

In other words, according to this implementation, the gradient of the values of the designated component of the decompressed data of the block is proportional to the gradient of the values of the non-designated components of the decompressed data of the block. Moreover, a linear combination between known values is relatively simple to implement, which makes it possible to minimize the complexity of the decompression method.

In the case where the addresses of the data including the extrema of the designated components are identified during the compression of the data of the block, the chosen data may be the data of the block including the particular values of the designated component. However, the chosen data may be the data of the block including the extrema of the values of each decompressed non-designated component of the data of the block.

According to one implementation, the linear combination may be performed according to a combination defined by the dependence indication. This implementation advantageously corresponds to an application to a decompression of images encoded in the RGB system.

In an example implementation, the reconstruction of the designated component may include error compensation using the residual error quantification. Residual error quantification makes it possible to use the method in a conservative context.

According to another aspect, an electronic device may be adapted for compressing a data block, with the data being respectively allocated with sets of homologous components. The electronic device may include selection means configured for selecting a component called the designated component, and compression means configured for compressing the non-designated components with measurable loss less than or equal to a threshold. The compression means may also be configured for compressing the designated component at least by selecting particular values taken from among the values of the homologous designated components associated with the data of the block. The device may be adapted for compressing a digital image signal, in which each item of data is a pixel of an image, and each component set associated with a pixel includes three components representative of the calorimetric space of the pixel.

According to one embodiment, the compression means may be configured for selecting the extrema of the values of the designated homologous components associated with the data of the block as particular values. The compression means may be configured for identifying the addresses of the data of the block including the extrema of values.

The compression means may be configured for generating a dependence indication representative of a correlation between the designated component and at least one non-designated component. According to one embodiment, the selection means may be configured for selecting the component whose values over all of the data of the block exhibit the smallest range of variation as a designated component. The compression means may also be configured for establishing a residual error quantification of the compression of the designated component.

According to another aspect, an electronic decompression device may be adapted for decompressing a data block compressed according to the compression method described above, and/or by an electronic compression device such as the one previously described. The electronic compression device may include decompression means configured for decompressing the non-designated components for each item of data of the block, and a reconstruction means configured for reconstructing the value of the designated component for each item of data in the block while taking account of the particular values and of the values of the decompressed non-designated components.

The device according to this aspect may be adapted for the decompression of a digital image signal in which each item of data is a pixel of an image, and each component set associated with a pixel includes three components representative of the colorimetric space of the pixel. According to one embodiment, the reconstruction means may be configured for limiting the value of the designated component by the particular values.

The reconstruction means may be configured for performing, for each item of data in the block, a linear combination between the values of the decompressed non-designated components of the item of data, and the particular values of the designated component of the data of the block and the values of the decompressed non-designated components of chosen data. According to one embodiment, the reconstruction means may be configured for carrying out the linear combination with, as chosen data, the data of the block including the particular values of the designated component.

According to another embodiment, the reconstruction means may be configured for carrying out the linear combination with, as chosen data, the data of the block including the extrema of each non-designated component over the data block. The reconstruction means may be configured for carrying out the linear combination according to a combination defined by the dependence indication. According to one embodiment, the reconstruction means may be configured for compensating an error by using the residual error quantification.

A data processing apparatus is also provided which may include an electronic compression device and an electronic decompression device, such as the ones described above. The data processing apparatus according to this aspect may, for example, be a transcoding system like a TV decoder.

According to another aspect, a computer program product is provided that may be directly loadable into a memory of a data processing system. This may include portions of software code for the execution of the compression method described above, and/or of the decompression method described above, when the program is executed on the data processing system.

Moreover, according to another aspect, a medium is provided that may be read by a data processing system. The medium may have instructions that may be executed by an adapted computer to bring about the execution by the data processing system of the compression method described above, or of the decompression method described above.

These different aspects may thus provide significant improvements in numerous compression devices and methods, with an average compression factor distinctly higher than the factors of the currently known approaches.

BRIEF DESCRIPTION OF THE DRAWINGS

Other advantages and features will become apparent upon examination of the detailed description of implementations, that are in no way limitative, and of the appended drawings, in which.

DETAILED DESCRIPTION

Figure 2:
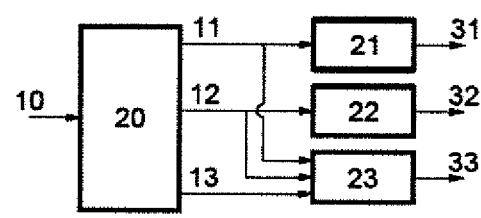
FIG. 2 is a schematic block diagram of a compression device in accordance with an example embodiment.

Referring to FIG. 2, a selection phase 20 selects a designated component 13 from among the non-compressed (or original) components 10 of the pixels of a block of an image, according to a criterion of minimal entropy. The block of pixels is relatively small in comparison with the overall image to ensure that the variety of colors over this block is small.

The other components 11, 12 are compressed into compressed non-designated components 31, 32, and the designated component is compressed into a designated component 33 compressed by repetitive computations 21, 22, 23.

The pixels may be coded in the RGB or YCbCr colorimetric system. In the RGB system, the choice of the designated component 13 is advantageously made between the two components R and B, because the component G is statistically the most characteristic of luminance of a pixel.

Similarly, in the YCbCr, the choice is advantageously made between the two chrominance components. The designated component is selected locally over the block based upon an estimation of the risk of generating an error on this component. Thus, the component exhibiting the smallest range of variation among the three components of the data of the block is selected as the designated component 13.

The compressions 21, 22 of the non-designated components 11, 12 are preferably carried out according to a method of compression with measurable loss less than or equal to a threshold. By way of example, the loss may be measured using a SSIM measurement, and in accordance with one example a threshold of 2% is used, corresponding to an SSIM of 98%. This corresponds over the majority of the images to a very good general fidelity with the appearance of very localized artefacts. This threshold corresponds to a signal to noise ratio of about 42 dB over an average image.

Such a compression may be obtained, for example, according to a Parametric Functional Compression (PFC), advantageously reusing a portion of the computations already carried out during the selection 20. Such a method is well known to those skilled in the art who will, for example, be able to refer to the French patent application published with the reference number 3,001,600 for further details.

The decompressed non-designated components 31, 32 resulting from a compression and then a decompression of the PFC type are visually true to the non-compressed, non-designated components 11, 12. The identification of the designated component may be coded in a single bit, but generally during the compression/decompression of the non-designated components, the components are identified by predictive reconstruction parameters. Thus, it is not necessary to transmit an identification of the designated component bit. Similarly, the values of the non-designated components are retrieved during the decompression of the compressed non-designated components 31, 32.

Thus, the values of the extrema of the designated component alone are sufficient for reconstructing the designated components of the data in the block. However, during an implementation applied to an RGB colorimetric space, it is advantageous to transmit dependence information in two bits to be able to reconstruct the designated component.

In fact, over a data block, the direction of variation of the designated component may be the same direction as, or the opposite direction to, the direction of variation of the non-designated components, or the same direction as one and the opposite direction to the other. This represents four possible cases which may be represented by two bits, e.g., by a data table.

In practice, for example in the case where the designated component is B, the indication of dependence indicates if $R(x_{Bmin}, y_{Bmin}) \leq R(x_{Bmax}, y_{Bmax})$, and if $G(x_{Bmin}, y_{Bmin}) \leq G(x_{Bmax}, y_{Bmax})$, where $R(x,y)$ and $G(x,y)$ are the respective values of the non-designated components of the item of data whose address is $(x,y)$, and $(x_{Bmin}, y_{Bmin})$ and $(x_{Bmax}, y_{Bmax})$ are respectively the addresses of the item of data including the minimum value Bmin of the designated component B and of the item of data including the maximum value Bmax of the designated component B.

In one implementation which provides enhanced performance but utilized additional storage space, the addresses $(x_{Bmin}, y_{Bmin})$ and $(x_{Bmax}, y_{Bmax})$ of the data including the extrema Bmin, Bmax of the designated component B over the block may be used for reconstructing the designated component. The dependence information is not necessary in this implementation.

Moreover, in a conservative context, a quantification of the residual error of the compression of the designated component may be desirable. In this case, the residual error is compressed.

The compression of the error is generally carried out by a quantification method based on a statistical distribution of the error. The most common errors are coded by short strings of characters, and the most rare errors by longer strings of characters. For example, the use of an exponential-Golomb code is common in the compression of residual errors of this type.

Figure 3:
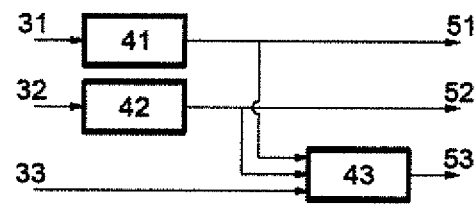
FIG. 3 is a schematic diagram illustrating decompression steps in accordance with an example implementation.

Turning to FIG. 3, the compressed non-designated components 31, 32 are decompressed according to a decompression method 41, 42 associated, for example, with the compression method PFC. The values of the decompressed non-designated components 51, 52 are visually true to the initial values of the non-designated components 11, 12 before compression.

For each item of data in the block, the compressed designated component 33 is decompressed according to an implementation 43 including a linear combination of the values of the decompressed non-designated components 51, 52 of the item of data, of the values of the extrema of the designated component 33, and of the values of the non-designated components of chosen data. The chosen data are data for which the values of the non-designated components are utilized for the reconstruction of the designated component of each item of data in the block.

The chosen data are either the data corresponding to the minimum and maximum values of the non-designated components or, if necessary, the data whose address has been transmitted. That is, it is the data corresponding to the minimum and maximum values of the designated component.

In the case of an implementation on data coded in the RGB colorimetric system, to consider that a unique color is present over the block is equivalent to considering that the designated component may be expressed as a linear combination of the non-designated components as follows:

$$Brec(x,y)=a*Rdec(x,y)+b*Gdec(x,y).$$

Considering here that B is the designated component 13, Brec is the reconstruction 53 of the designated component B, Rdec and Gdec are the decompressed non-designated components 51, 52. Moreover, (x,y) represents the address of the pixel which includes the component in question. Further, a and b are coefficients expressed as a function of the values of the non-designated components of the chosen data.

Control of the direction of variation of the designated component with the direction of variation of the non-designated components is carried out during the compression steps. The indication of dependence makes it possible to associate the extrema of the designated component with the values of the non-designated components of the chosen data.

Thus, if $R(x_{Bmin}, y_{Bmin}) \le R(x_{Bmax}, y_{Bmax})$, then the minimum value Bmin of the designated component B is associated with the minimum value of Rdec, and the maximum value Bmax of the designated component B is associated with the maximum value of Rdec. Otherwise, Bmin is associated with the maximum value of Rdec, and Bmax is associated with the minimum value of Rdec.

If $G(x_{Bmin}, y_{Bmin}) \le G(x_{Bmax}, y_{Bmax})$, then Bmin is associated with the minimum value of Gdec, and Bmax is associated with the maximum value of Gdec. Otherwise, Bmin is associated with the maximum value of Gdec, and Bmax is associated with the minimum value of Gdec.

Thus, during the decompression 43, and so that the reconstructed designated components are limited and follow the tendency of the non-designated components, the coefficients a and b can be calculated as follows:

$a=(1/p)*(Bmin*Gdec2-Bmax*Gdec1)$ if $p \ne 0$, otherwise $a=\frac{1}{2}$, and $b=(1/p)*(Bmax*Rdec1-Bmin*Rdec2)$ if $p \ne 0$, otherwise $b=\frac{1}{2}$, where p=Rdec1*Gdec2−Rdec2*Gdec1, Rdec1 is the value of the first non-designated component to be associated with Bmin, Rdec2 is the value of the first non-designated component to be associated with Bmax, Gdec1 is the value of the second non-designated component to be associated with Bmin, and Gdec2 is the value of the second non-designated component to be associated with Bmax.

In the case where the addresses of the extrema of the designated component B are transmitted, then it is directly associated with the extrema Bmin, Bmax of the designated component B:

$$Rdec1=Rdec(x_{Bmin}, y_{Bmin});$$

$$Rdec2=Rdec(x_{Bmax}, y_{Bmax});$$

$$Gdec1=Gdec(x_{Bmin}, y_{Bmin}); \text{ and}$$

$$Gdec2=Gdec(x_{Bmax}, y_{Bmax}).$$

In the preceding equations, Rdec1, Rdec2, Gdec1, and Gdec2 are the different values of the decompressed non-designated components of chosen data. The reconstructed values of the decompressed designated components of the decompressed data of the block are then limited by the extreme values of the non-compressed designated component. Thus, even if the approximation of proportionality between the gradient of the components is not ideal, the error is limited to an acceptable level by the limitation.

The same principle is applied in the case of an implementation on data in the YCbCr colorimetric system. It is possible and advantageous, in the YCbCr colorimetric system, to reconstruct the values of the designated component U(x,y) by being based solely on the other decompressed chroma component Vdec(x,y), the linear combination being able to be written as follows:

$$Urec(x,y)=c+d*Vdec(x,y),$$

where Urec is the reconstruction of the designated component, and Vdec is the other decompressed chroma component.

Figure 1:
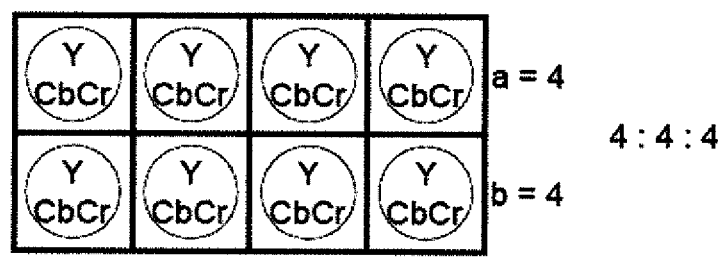
FIG. 1 is a schematic diagram of examples of chrominance samplings in the YCbCr system in accordance with the prior art.
Figure 1:
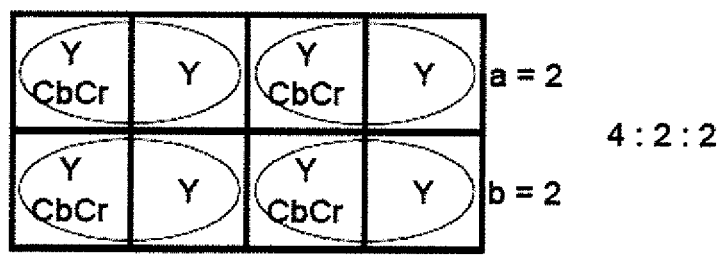
Figure 1:
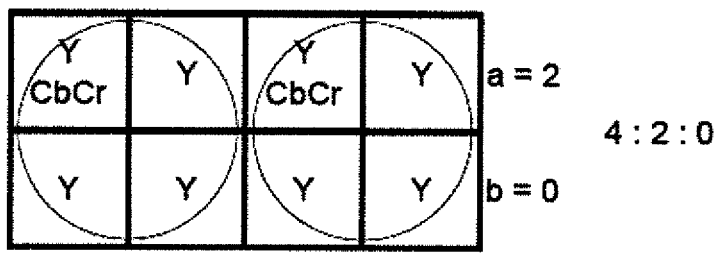
Figure 4:
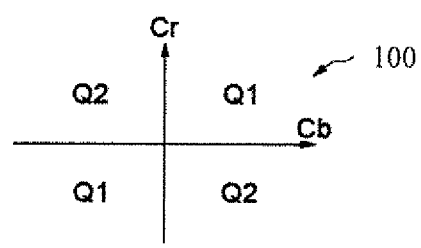
FIG. 4 is a graph of a Cb/Cr reference system for use with an example decompression implementation.

The control of the proportionality of the designated component is carried out directly as a function of the extreme values of Urec and Vdec during the decompression steps, taking account of the fact that, in a Cb/Cr reference system such as shown in FIG. 4 and referenced in FIG. 1, the pixels of similar colors are substantially aligned with the origin in the reference system 100.

Thus, as a function of the position of the points representing the extreme values of the chroma components in the quadrants Q1, Q2 of the reference system 100, it is possible to know if U varies in the same direction as V (quadrants Q1) or in the opposite direction (quadrant Q2). The minimum value of Urec is then associated with the minimum or maximum value of Vdec, the maximum value of Urec is associated with the maximum or minimum value of Vdec.

The shift term "c" makes it possible to compensate for slight color deviations in the block. Thus, during the decompression 43, the coefficients c and d can be calculated as follows:

$c=(1/q)*(Umin*Vdec2-Umax*Vdec1)$ if $q \ne 0$, otherwise $c=\frac{1}{2}$, $d=(1/q)*(Umax-Umin)$ if $q \ne 0$, otherwise $d=\frac{1}{2}$, where q=Vdec2−Vdec1, Umin is the minimum value of the designated component over the block, Umax is the maximum value of the designated component over the block, Vdec1 is the value of the non-designated chroma component to be associated with Umin, and Vdec2 is the value of the non-designated chroma component to be associated with Umax.

In the case where the addresses of the data corresponding to the extrema of U are transmitted, $$V\text{dec}1 = V\text{dec}(x_{Umin}, y_{Umin}), \text{ and}$$

$$V\text{dec}2 = V\text{dec}(x_{Umax}, y_{Umax}).$$

In the preceding equations, Vdec1 and Vdec2 are the different values of the decompressed non-designated components of chosen data.

As seen above, all of the reconstructed values of the decompressed designated components are limited by the extreme values of the non-compressed designated component. Moreover, if the residual error has been quantified during the compression of the designated component, it is possible to compensate for the potential reconstruction errors using the information included in the quantification.

By way of example, the use of a PFC method over a block of 4*4 pixels of which each component is coded in 10 bits makes it possible to obtain a compression factor of 1.7 (the compressed components are coded in 92 bits, 160/92=1.7). The structural similarities (SSIM) between the compressed components and the decompressed components are greater than or equal to 99% in a PFC method.

According to a previously described implementation, with the two compressed non-designated components coded in 92 bits, and the compressed designated component coded in 20 bits (2*10 bits for the extrema of the designated component), a compression factor greater than 2 is obtained, with an SSIM greater than or equal to 98% on the designated component. By way of comparison, typical compressions reach a compression factor equal to 2 exhibiting an SSIM loss of 5% over the three components for an independent method per component, and an SSIM loss of 10% to 20% on the designated component for an asymmetric method.

Figure 5:
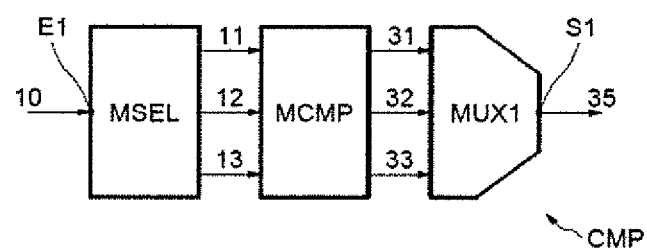
FIG. 5 is a schematic block diagram of a compression device in accordance with an example embodiment.

Referring to FIG. 5, a compression device CMP illustratively includes an input E1 receiving a block of data including a set of components 10, e.g., three components R, G, B. The compression device CMP includes a selection means or circuitry MSEL configured for selecting, locally over the data block, a designated component 13. The selection means MSEL is configured for selecting the component having the lowest entropy as the designated component 13.

The designated component 13 and other two components, called non-designated components 11, 12, are transmitted to a compression means or circuitry MCMP configured for carrying out a compression with measurable loss less than a threshold over the non-designated components 11, 12. Such compression may be performed, for example, according to a PFC method.

The compression means MCMP is also configured for isolating the extrema of the designated component, e.g., using digital comparators. The compression means MCMP is configured for including the values of the extrema and, if the memory space is available, the addresses of the data including them in the items of information contained by the compressed designated component 33.

The compression means MCMP is configured for comparing the variations of the non-designated components 11, 12 with the designated component 13, and identifying a correlation between the variations and generating a dependence indication in two bits, e.g., coded by a data table.

By way of example, in the case where the designated component is B and with the same notation as described in detail above, the two bits of the indication of dependence may indicate the result of the respective logic tests "if $R(x_{Bmin}, y_{Bmin}) \leq R(x_{Bmax}, y_{Bmax})$" and "if $G(x_{Bmin}, y_{Bmin}) \leq G(x_{Bmax}, y_{Bmax})$". The compression means MCMP is configured for including the dependence indication in the information contained by the compressed designated component 33. It may also be configured for carrying out a quantification of the residual error and including it in the information contained by the compressed designated component 33.

The compressed non-designated components 31, 32 and the compressed designated component 33 are then multiplexed 35 by a multiplexer MUX1, for example, to be transmitted via a data bus. The output S1 of the multiplexer MUX1 forms the output of the compression device CMP. Moreover, in a conservative context, the compression means MCMP may be configured for performing a quantification of the residual error. By way of example, this may be done by applying a method based on a statistical distribution of the error, such as an exponential-Golomb code.

Figure 6:
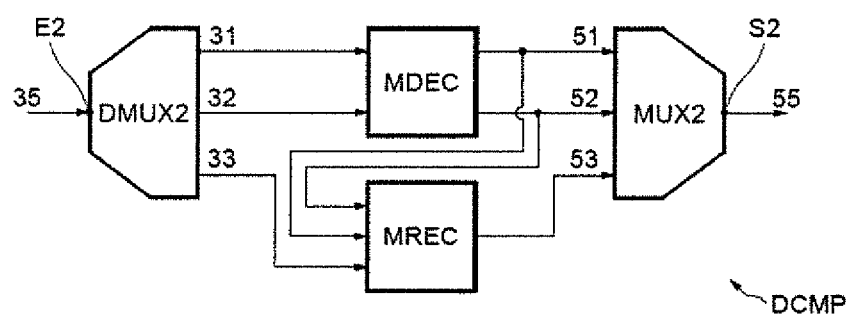
FIG. 6 is a schematic block diagram of a decompression device in accordance with an example embodiment.

Turning to FIG. 6, a decompression device DCMP illustratively includes an input E2 receiving a block of compressed data including a set of components 35, e.g., three compressed components resulting from the use of a device of the type shown in FIG. 5. The decompression device DCMP includes a demultiplexer DMUX2 separating the compressed data 35 into two compressed non-designated components 31, 32 and a reference called compressed 33. The compressed non-designated components 31, 32 are transmitted to a decompression means or circuitry MDEC configured for decompressing the compressed non-designated components 31, 32 into decompressed non-designated components 51, 52.

The items of information in the compressed designated component 33 are the values of the extrema of the non-compressed designated component of the data and also, for example, the addresses of the data including the extrema or a dependence indication coded in 2 bits. The information included in the compressed designated component may also include a quantification of the residual error.

A reconstruction means or circuitry MREC is configured for reconstructing the designated components of each item of data in the block, while assigning them with a value limited by the extrema, from the values of the decompressed non-designated components 51, 52 and the values of the extrema contained in the information 33 of the compressed data. The reconstruction means MREC may also be configured for compensating for a reconstruction error thanks to a quantification of the residual error.

The decompressed non-designated components 51, 52 and the compressed designated component 53 are then multiplexed by a multiplexer MUX2, e.g., to be transmitted via a data bus. The different means of the compression device CMP and of the decompression device DCMP may be produced, for example, via software within a microprocessor or microprocessors.

Figure 7:
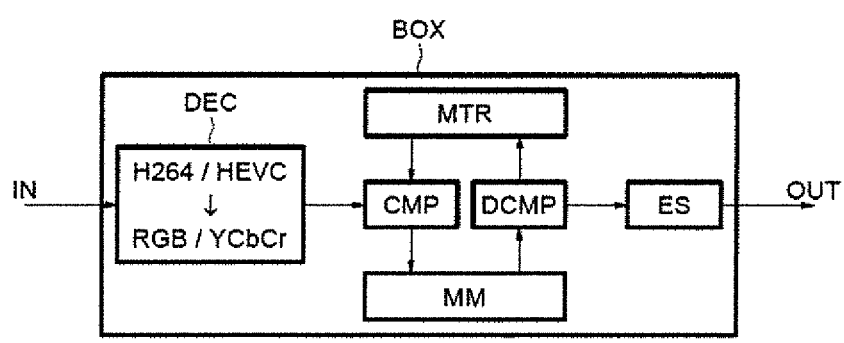
FIG. 7 is a schematic block diagram of a digital decoder in accordance with an example embodiment.

Turning to FIG. 7, a data processing apparatus BOX (e.g., a digital transcoder such as a TV decoder) illustratively includes a video input IN, a decoder DEC, processing means or circuitry MTR, a memory means or circuitry MM, an output stage ES, a video output OUT, a compression device CMP according to an example embodiment, and a decompression device DCMP according to an example embodiment. The incoming signal on the input IN is a video signal encoded, e.g., according to an H264 or HEVC standard, which may be transmitted by a satellite or terrestrial antenna, a coaxial cable, or by an Ethernet connection. The decoder DEC is configured for decoding the incoming video signal into an image format of the "bitmap" type, e.g., in the RGB or YCbCr formats.

The decoded video signal is sent to the input of the compression device CMP, which implements a compression of the decoded images according to the invention. The compressed data is stored in the memory means MM. The processing means MTR operates on the decoded images in formats of the RGB or YCbCr type. The processing means MTR may implement decoding of protected data, or improvements of graphics rendering.

The data to be processed by the processing means MTR is first decompressed by the decompression device DCMP according to an example implementation, from the compressed data stored in the memory means MM. The data processed by the processing means MTR, in an RGB or YCbCr format, is then compressed by the compression device CMP and stored in the memory means MM. The data stored in the memory means MM is decompressed by the decompression device DCMP before being transmitted by the output stage ES to a display system connected to the output OUT of the data processing apparatus BOX. The output stage is configured for encoding the signal, which is in an RGB or YCbCr formation, into an HDMI or DVI format, for example.

The invention claimed is:

1. A method of compressing a data block comprising a plurality of sets of homologous components, the method comprising:
    selecting an uncompressed designated component from among the plurality of sets of homologous components, with remaining components of the plurality of sets of homologous components being uncompressed non-designated components;
    compressing the uncompressed non-designated components with a measurable loss less than or equal to a threshold; and
    selecting a subset of values associated with the uncompressed designated components within the data block and compressing the uncompressed designated components within the data block using the subset of values and values of the uncompressed non-designated components within the data block, wherein compressing the uncompressed designated components comprises generating a dependence indication representing a correlation between a color variation of the uncompressed designated components and a color variation of at least one of the uncompressed non-designated components.

2. The method of claim 1 wherein each set of homologous components corresponds to a pixel of an image and comprises three components representative of a colorimetric space of the pixel.

3. The method of claim 1 wherein the subset of values associated with the uncompressed designated components comprises extrema of the values of the designated components.

4. The method of claim 3 wherein selecting the subset of values comprises identifying addresses of the uncompressed designated components having the extrema associated therewith.

5. The method of claim 1 wherein the uncompressed designated component is selected based upon having a range of variation of the values thereof being less than a range of variation of values for the non-designated components.

6. The method of claim 1 further comprising decompressing the data block by:
    decompressing the non-designated components; and
    reconstructing the values of the uncompressed designated components based upon the subset of values and the decompressed non-designated components.

7. The method of claim 6 wherein reconstructing comprises reconstructing the values of the uncompressed designated components based upon a linear combination of the subset of values and the decompressed non-designated components.

8. The method of claim 7 wherein the linear combination is carried out according to a combination defined by the dependence indication.

9. The method of claim 6 further comprising quantifying a residual error of the compression of the designated components.

10. The method of claim 9 wherein reconstructing comprises reconstructing the values of the uncompressed designated components based upon an error compensation using the residual error quantification.

11. An electronic device for compressing a data block comprising a plurality of sets of homologous components, and comprising:
    selection circuitry configured to select an uncompressed designated component from among the plurality of sets of homologous components, with remaining components of the plurality of sets of homologous components being uncompressed non-designated components; and
    compression circuitry configured to
        compress the uncompressed non-designated components with a measurable loss less than or equal to a threshold,
        compress the uncompressed designated components within the data block using a subset of values associated with the uncompressed designated components within the data block and values of the uncompressed non-designated components within the data block, and
        generate a dependence indication representing a correlation between a color variation of the uncompressed designated components and a color variation of at least one of the uncompressed non-designated components.

12. The electronic device of claim 11 wherein each set of homologous components corresponds to a pixel of an image and comprises three components representative of a colorimetric space of the pixel.

13. The electronic device of claim 11 wherein the subset of values associated with the uncompressed designated components comprises extrema of the values of the designated components.

14. The electronic device of claim 13 wherein said compression circuitry is further configured to identify addresses of the uncompressed designated components having the extrema associated therewith.

15. The electronic device of claim 11 wherein said selection circuitry selects the uncompressed designated component based upon having a range of variation of the values thereof being less than a range of variation of values for the uncompressed non-designated components.

16. The electronic device of claim 11 further comprising decompression circuitry configured to decompress the data block by:
    decompressing the non-designated components; and
    reconstructing the values of the uncompressed designated components based upon the subset of values and the decompressed non-designated components.

17. The electronic device of claim 16 wherein said decompression circuitry reconstructs the values of the uncompressed designated components based upon a linear combination of the subset of values and the decompressed non-designated components.

18. The electronic device of claim 17 wherein said decompression circuitry performs the linear combination according to a combination defined by the dependence indication.

19. A non-transitory computer-readable medium having computer-executable instructions for causing a computer to perform steps comprising:
   for a data block comprising a plurality of sets of homologous components, selecting an uncompressed designated component from among the plurality of sets of homologous components, with remaining components of the plurality of sets of homologous components being uncompressed non-designated components;
   compressing the uncompressed non-designated components with a measurable loss less than or equal to a threshold; and
   selecting a subset of values associated with the uncompressed designated components within the data block and compressing the uncompressed designated components within the data block using the subset of values and values of the uncompressed non-designated components within the data block, wherein compressing the uncompressed designated components comprises generating a dependence indication representing a correlation between a color variation of the uncompressed designated components and a color variation of at least one of the uncompressed non-designated components.

20. The non-transitory computer-readable medium of claim 19 wherein each set of homologous components corresponds to a pixel of an image and comprises three components representative of a colorimetric space of the pixel.

21. The non-transitory computer-readable medium of claim 19 wherein the subset of values associated with the uncompressed designated components comprises extrema of the values of the designated components.

22. The non-transitory computer-readable medium of claim 19 further having computer-executable instructions for causing the computer to decompress the data block by:
   decompress the non-designated components; and
   reconstruct the values of the uncompressed designated components based upon the subset of values and the decompressed non-designated components.

* * * * *